March 10, 1942.　　　M. SCHWARTZ　　　2,276,102
EYEGLASSES
Filed Sept. 11, 1940
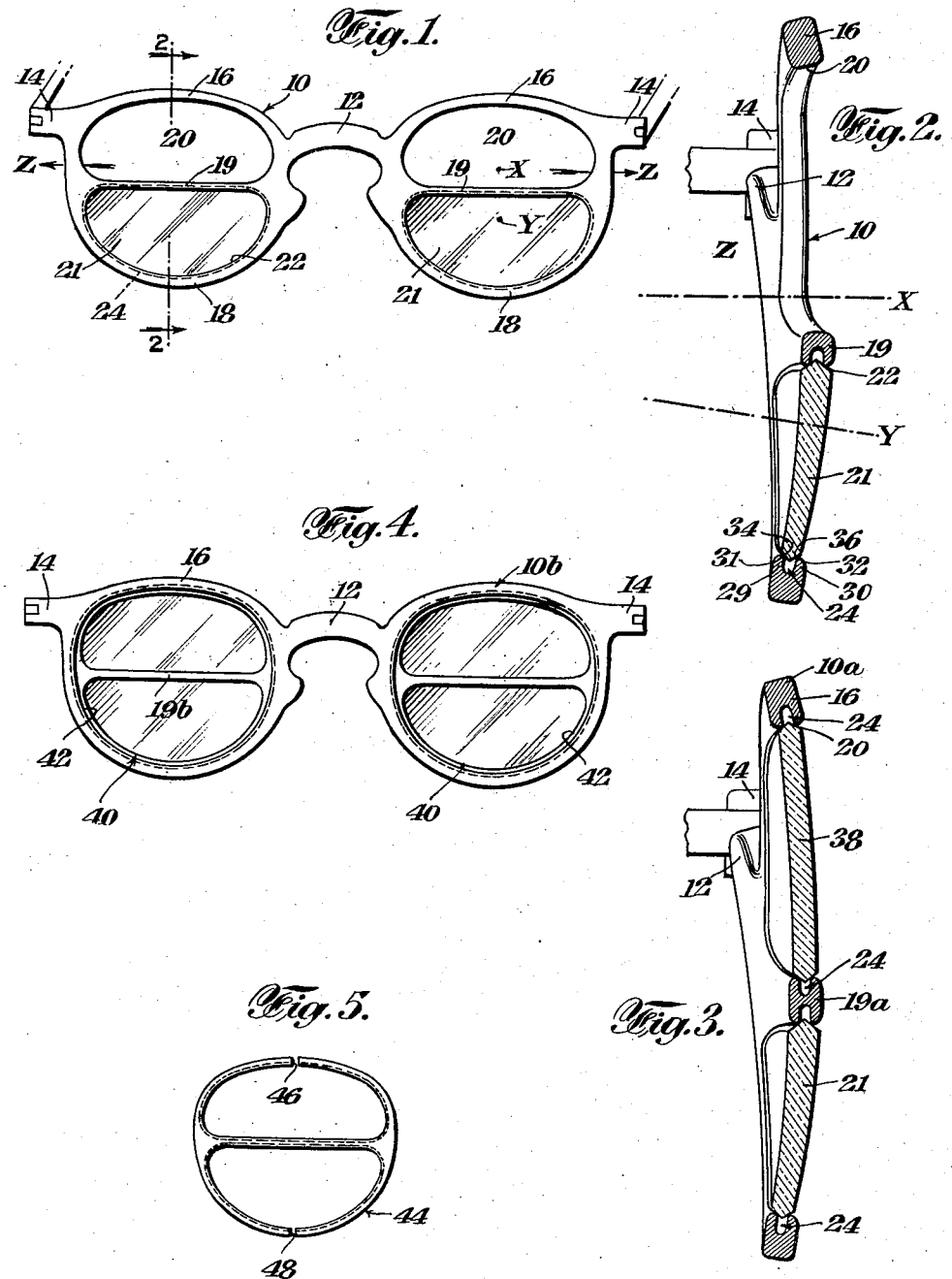
INVENTOR
Morris Schwartz
BY Benjamin Kahn
ATTORNEY Patented Mar. 10, 1942

2,276,102

UNITED STATES PATENT OFFICE 2,276,102

EYEGLASSES

Morris Schwartz, New York, N. Y., assignor of one-half to Leah Lapidus, New York, N. Y.

Application September 11, 1940, Serial No. 356,289

5 Claims. (Cl. 88—47)

This invention relates to improvements in eyeglasses and has particular reference to an improved construction for mounting of fractional lenses in rim type frames.

The principal object of my invention is to provide a comfortable frame with simple means for firmly yet yieldably retaining such fractional lenses whereby the lenses may be easily inserted or removed from the frame openings.

Another object of my invention is to provide eyeglasses of the above character which are highly efficient in use, easy to manufacture, of rugged construction and attractive in appearance.

This invention also contemplates the production of eyeglasses of the above character providing a full side view outside the normal zone of sight and adapted to hold in the frame, within the normal zone of sight, fractional lenses adapted for near or far vision or both.

Other objects, features and advantages are contemplated, some of which will be specifically referred to while others will later become apparent in the specification.

The attainment of some of these objects resides in the construction and arrangement of the component portions of the structure. Only certain forms embodying the invention are illustrated in the drawing forming part of this disclosure, in which:

Fig. 1 is a front view of a preferred form of the invention.

Fig. 2 is a sectional view taken on the line 2—2 of Fig. 1.

Fig. 3 is a similar view to that of Fig. 2, but a modified form of the invention.

Fig. 4 is a front view of another form of the invention.

Fig. 5 is a front view of an element of still another form of the invention.

Referring to Fig. 1, the frame 10 is of the rim type comprising a unitary piece of metal, shell or other similar material such as Celluloid or other plastics. The frame 10 is a unitary piece comprising a nose portion 12, temple-hinge portions 14 and arcuate upper and lower portions 16 and 18 respectively. These arcuate portions generally embrace what is herein referred to as "the zone of sight", this being within the range of vision through the frame in all generally forward directions without lateral or vertical strain. The scope of normal vision, however, extends beyond the confines of these arcuate portions and an important view is sidewise.

The most important views are straight ahead, substantially through the center X of the zone of sight, or slightly above, and the view through the zone of sight along the sight axes Y, below the horizontal plane of the center of the zone of sight. Usually the upper view is for far vision and the lower for near vision.

Most persons wearing glasses require them for a deficiency in either near or far vision and with full size correction lenses, find themselves hampered by being required to either look through these lenses even when not needed, or required to remove their glasses.

More matured persons require only reading glasses, their far vision being good. Many persons, however, require lenses only for far vision and could well dispense with lenses when reading. All persons wearing glasses regardless of their deficiencies have frequent occasion to direct their sight horizontally sidewise beyond the confines of the frame in the direction Z.

With this explanation of some of the major requirements concerning the comfort of the wearer, the description will proceed with particular consideration to the specific requirements of the matured person.

Referring to Figs. 1 and 2, the frame 10 is provided with a transverse portion 19 integrally formed with the other portions of the frame. This transverse portion extends substantially across the zone of sight between the axes X and Y and is integral with the brim (at the ends thereof) with fillets formed at the end junctures. Such location places the transverse portion at or below the center of the zone of sight, preferably not above. With this construction, two separate and distinct lens openings 20 and 22 are provided, each of chordal shape with rounded corners adapted to receive a fractional lens of the same shape. Each lower opening in this form is provided with a continuous groove 24 in the frame portion of the lower opening which groove continues uninterruptedly in the fillets and extends to the under surface of the transverse portion 19. This groove is adapted to receive the bevelled edges of the chordal shaped fractional lens, the apex of this bevelled edge fitting into the groove 24. The lens shown in Figs. 1 and 2 is preferable to improve near vision as in reading and doing other close work generally positioned below the level of the eyes. The upper opening 20 is shown without a groove inasmuch as it may be blank without a lens therein. In such cases where no far vision lenses are necessary or desired in the opening 20, the arcuate portions 16 may also be omitted, leaving the temple-hinge portions 14 extending upwardly from what would ordinarily appear as a low fractional frame.

Referring to Fig. 2, the groove 24 is substantially deeper than the largest periphery of the lens edge. Two walls 29 and 30 are formed by such grooves, the upper portions of which provide contact lines 31 and 32 with the bevelled edges 34 and 36 of the lens 21. Likewise the groove in the transverse portion 19 is adapted to hold the lens along its upper edge. It will be understood that it is not essential that the groove be continuous as illustrated. Separate grooves of limited length of the character described may be provided in the arcuate and transverse portions to receive local projections from the edge of the lens. The periphery between such local projections may be contoured to fit but not necessarily project into the portions of the frame intermediate the local grooves.

Referring to Fig. 3, illustrating another form of the invention previously described, a far vision lens 38 is provided in the upper opening 20 of the frame 10a. The transverse portions 19a have grooved means, similar to that described, for engaging the lower edge of the upper lens, and likewise, the upper portion 16 is also provided with similar lens engaging means. It can be seen that in cases where the lower lens is not needed the lens retaining groove in the lower opening may be omitted and also the lower arcuate portion surrounding such lower lens may also be omitted leaving a frame having a transverse member below the nose and temple-hinge portions at or not above the center of the zone of sight.

Referring to Fig. 4, showing still another form, the frame 10b is of similar outline as that previously described except that the transverse member 19b forms an integral part of inserts 40 adapted to fit openings 42 in the frame having openings each of similar contour as the inserts 40. While the frame 10b may be of shell or plastic material, the inserts 40 may be of another material. In any case, the transverse portion of the insert is disposed below the temple and nose piece and not higher than the center plane of the zones of sight.

Referring to Fig. 5, a modified form of insert 44 similar to that previously described is shown. In this form the insert may be of metal having slots 46 and 48 in the upper and lower arcuate portions. This form also provides a transverse portion dividing the insert to form lens receiving openings for fractional lenses of the previously mentioned character, and is adapted to snap over the edges thereof. This form being of metal and not inherently expansible is split in each of the arcuate portions to take up the increase by the required enlargement of its perimeter in going over the apex of the bevelled edges of the lenses. In inserting this type into an expansible shell or plastic frame, the frame being capable of yielding is adapted to receive the metal insert, lenses assembled, in grooves provided therefor. With reference to Fig. 2, it will be noted that the walls 29 and 30 are capable of spreading to hold the lenses firmly. The lenses are preferably made slightly oversized to cause such spreading. In inserting the lenses into the openings of the frame of Fig. 1, the frame being of yieldable material, the arcuate and transverse members as well as the walls of the groove will yieldably expand sufficiently to permit the non-yielding glass lens to be snapped into the grooves. In assembling the lenses in the form of Fig. 4, the lenses may be affixed within the insert 40, whereafter the portions of the frame 10b are caused to expand during the insertion of the inserts. In the event the rim is of metal with a metallic integral transverse portion, the grooves are to be of sufficient depth as to allow yielding of the walls to permit the lens to be snapped into the frame openings. It is to be understood that sun-shade lenses may be placed in the upper openings and the lower may or may not be provided with lenses.

Having thus described my invention in connection with the illustrated modifications involved in the principle thereof, it is obvious that minor variations may be made without departing from the scope of my invention in its broader aspects.

What I claim is:

1. A unitary eyeglass frame of the character described including a nose portion and temple-hinge portions above the center-plane of the zones of sight, lower arcuate portions integrally joining said nose and respective hinge portions and forming the lower boundary of the zones of sight and extending downwardly from said nose and respective hinge portions, transverse portions integrally joined at their ends by fillets to said lower portion to form lower fractional lens openings, said transverse portions being in the zones of sight not higher than the centers thereof, said lenses having bevelled peripheral edges, an endless groove in said transverse portions extending uninterruptedly in said fillets, and in said lower arcuate portions, said grooves adapted to receive only the said bevelled edges.

2. A unitary eyeglass frame of the character described including a nose portion and temple-hinge portions above the center-plane of the zones of sight, upper and lower arcuate portions integrally joined with said nose and hinge portions to form a boundary for the zone of sight, transverse portions integrally joined by fillets to opposite sides of the portions bounding the zones of sight and dividing each of said zones to form upper and lower pairs of lens openings with rounded corners, said transverse portions being in the zones of sight not higher than the center thereof, lens retaining grooves in the transverse portions extending into said fillets and into said arcuate portions of the frame, and fractional lenses having edges fitting into said grooves.

3. In rim type eyeglasses comprising a unitary frame member having a nose piece and temple-hinge pieces above the center-plane of the zones of sight, said frame member providing boundaries for the zones of sight of each eye, transverse members having integral fillets at their ends forming integral parts of said frame and extending substantially horizontally across the zones of sight, said transverse members being positioned not higher than the centers of said zones, said transverse members having lens engaging grooves extending uninterruptedly into said fillets.

4. Eyeglasses of the character described, comprising a unitary frame member defining a zone of sight for each eye, a transverse portion integrally formed with said frame with fillets at the end thereof at the juncture with said frame and extending substantially horizontal and completely thereacross, said edge of said transverse portion dividing the said zone of sight into upper and lower lens openings, a lens engaging groove extending uninterruptedly along one horizontal edge of said transverse portion, and continuing uninterruptedly into the said fillets and along the side edge of the related lens openings, said groove being adapted to engage only the bevelled edge of a fractional lens the shape of said opening, said transverse portion being positioned not higher than the center of the zone of sight.

5. A unitary eyeglass frame of the character described including, frame portions having a nose portion and temple-hinge portions above the center-plane of the zones of sight, transverse portions integrally joined at said nose portion and at said hinge portions to said frame by integrally formed fillets, said transverse portions being in the zones of sight no higher than the centers thereof, and fractional lenses in a portion of each zone of sight having bevelled peripheral edges portions of which extend substantially horizontally across the zones of sight, and endless and uninterrupted grooves in said transverse portions and frame portions adapted to receive only the said bevelled edges of said fractional lenses.

MORRIS SCHWARTZ.